United States Patent
Johnson et al.

(10) Patent No.: US 10,614,775 B2
(45) Date of Patent: Apr. 7, 2020

(54) ELECTRONIC DEVICES HAVING BACKLIT KEYBOARDS DISPLAYS WITH ADJUSTABLE WHITE POINTS

(71) Applicant: Apple Inc., Cupertino, CA (US)

(72) Inventors: Paul V. Johnson, San Francisco, CA (US); Lu Zhang, Campbell, CA (US); Jiaying Wu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/979,315

(22) Filed: May 14, 2018

(65) Prior Publication Data

US 2019/0051267 A1     Feb. 14, 2019

Related U.S. Application Data (60) Provisional application No. 62/542,727, filed on Aug. 8, 2017.

(51) Int. Cl.

| | |
|---|---|
| *G06F 1/16* | (2006.01) |
| *G09G 5/02* | (2006.01) |
| *G06F 3/02* | (2006.01) |
| *G06F 3/14* | (2006.01) |
| *G09G 3/34* | (2006.01) |
| *G09G 5/00* | (2006.01) |

(52) U.S. Cl.
CPC ............. *G09G 5/02* (2013.01); *G06F 1/165* (2013.01); *G06F 1/1616* (2013.01); *G06F 1/1662* (2013.01); *G06F 1/1692* (2013.01); *G06F 3/0202* (2013.01); *G06F 3/1423* (2013.01); *G09G 3/34* (2013.01); *G09G 5/003* (2013.01); *G06F 1/1681* (2013.01); *G09G 2320/062* (2013.01); *G09G 2320/0666* (2013.01); *G09G 2360/144* (2013.01)

(58) Field of Classification Search
CPC ...... G06F 1/1616; G06F 1/165; G06F 1/1662; G06F 1/1692; G09G 2320/0666; G09G 2360/144

See application file for complete search history.

(56) References Cited

U.S. PATENT DOCUMENTS

| | | | |
|---|---|---|---|
| 7,019,736 B2 | 3/2006 | Allen et al. | |
| 8,915,633 B2 | 12/2014 | Pance et al. | |
| 9,557,473 B2 | 1/2017 | Nichol et al. | |
| 9,947,275 B1 * | 4/2018 | Ramanath | G09G 3/3413 |

(Continued)

*Primary Examiner* — Michael Pervan
(74) *Attorney, Agent, or Firm* — Treyz Law Group, P.C.; G. Victor Treyz; David K. Cole (57) ABSTRACT

An electronic device may have a main display and an ancillary display that forms a dynamic function row. The device may also have a backlit keyboard with glyphs. The keyboard may have light-emitting diodes that emit backlight illumination. The backlight illumination has a backlight illumination color and intensity. A color ambient light sensor may measure ambient light color and intensity. Control circuitry in the laptop computer may make white point adjustments to the main and ancillary displays. White point adjustments may be made based on factors such as the backlight illumination intensity, information on the nominal white point of a display (which may be comparable to the color of the backlight illumination), information on the ambient light color and intensity, and a white point adaptation scaling factor.

18 Claims, 5 Drawing Sheets

(56) References Cited

U.S. PATENT DOCUMENTS

| | | | |
|---|---|---|---|
| 2008/0303918 A1* | 12/2008 | Keithley | G09G 3/20 |
| | | | 348/223.1 |
| 2011/0043549 A1 | 2/2011 | Chestakov et al. | |
| 2012/0050307 A1* | 3/2012 | Mahowald | H05B 37/0218 |
| | | | 345/590 |
| 2015/0070337 A1* | 3/2015 | Bell | G09G 3/2003 |
| | | | 345/207 |
| 2015/0370339 A1* | 12/2015 | Ligtenberg | G06F 1/1662 |
| | | | 345/168 |
| 2016/0358584 A1 | 12/2016 | Greenebaum et al. | |
| 2017/0091515 A1* | 3/2017 | Cao | G06F 1/1616 |
| 2018/0188773 A1* | 7/2018 | Perelli | G06F 1/165 |
| 2018/0188774 A1* | 7/2018 | Ent | G06F 1/165 |

\* cited by examiner

ELECTRONIC DEVICES HAVING BACKLIT KEYBOARDS DISPLAYS WITH ADJUSTABLE WHITE POINTS

This application claims the benefit of provisional patent application No. 62/542,727, filed Aug. 8, 2017, which is hereby incorporated by reference herein in its entirety.

FIELD

This relates generally to electronic devices and, more particularly, to electronic devices with displays.

BACKGROUND

Electronic devices often include displays. For example, a laptop computer may have a color display for displaying images for a user. Laptop computers may also have keyboard keys and other input-output devices.

During operation, the intensity and color of ambient lighting may change. If care is not taken, ambient light changes and changes in the operating settings of components in the laptop computer may cause the appearance of keyboard keys, displays, and other input-output devices to vary in ways that are not visually appealing.

SUMMARY

An electronic device may have a main display and an ancillary display that forms a dynamic function row. The device may also have a backlit keyboard with glyphs adjacent to the ancillary display. The keyboard may have light-emitting diodes that emit backlight illumination for the glyphs.

The backlight illumination of the keyboard has a backlight illumination color and intensity. A color ambient light sensor may measure ambient light color and intensity.

White point adjustments may be made based on factors such as the backlight illumination intensity, information on the nominal white point of a display (which may be comparable to the color of the backlight illumination), information on the ambient light color and intensity, and a white point adaptation scaling factor.

DETAILED DESCRIPTION

Electronic devices such as cellular telephones, laptop computers, tablet computers, electronic devices in embedded systems such as systems in homes and vehicles or other embedded system equipment, and other devices may have input-output devices for gathering input and providing a user with output. The input-output devices may include displays, touch screen displays, keyboards, and other input-output components.

Aspects of the appearance of input-output components such as these may be adjusted during device operation to ensure that an electronic device is visually appealing to a user. For example, the white point of one or more displays may be adjusted depending on changes in ambient lighting conditions and other variables.

Figure 1:
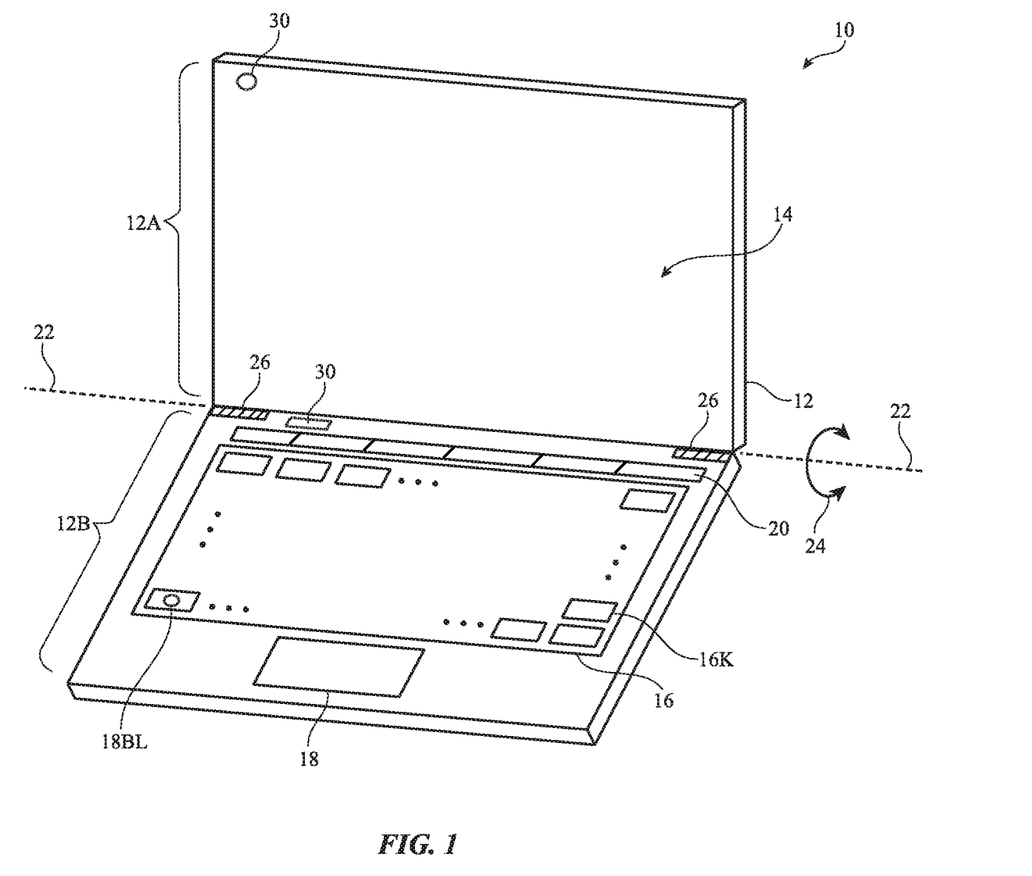
FIG. 1 is a perspective view of an illustrative electronic device such as a laptop computer in accordance with an embodiment.

An illustrative electronic device in which the white point of displayed content can be adjusted is shown in FIG. 1. Device 10 of FIG. 1 is a laptop computer. If desired, device 10 may be a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, or other electronic equipment. The laptop computer of FIG. 1 is merely illustrative.

As shown in the example of FIG. 1, device 10 may have a housing such as housing 12. Housing 12 may be formed from plastic, metal (e.g., aluminum), fiber composites such as carbon fiber, glass, ceramic, other materials, and combinations of these materials. Housing 12 or parts of housing 12 may be formed using a unibody construction in which housing structures are formed from an integrated piece of material. Multipart housing constructions may also be used in which housing 12 or parts of housing 12 are formed from frame structures, housing walls, and other components that are attached to each other using fasteners, adhesive, and other attachment mechanisms.

Device 10 may have a one-piece housing or a multi-piece housing. As shown in FIG. 1, for example, electronic device 10 may be a device such as a portable computer or other device that has a two-part housing formed from an upper housing portion such as upper housing 12A and lower housing portion such as lower housing 12B. Upper housing 12A may include a display such as display 14 and may sometimes be referred to as a display housing or lid. Lower housing 12B may sometimes be referred to as a base housing or main housing.

Housings 12A and 12B may be rotatably coupled to each other using hinges 26 along the upper edge of lower housing 12B and the lower edge of upper housing 12A. Hinges 26 may be located at opposing left and right sides of housing 12 along hinge axis 22. Hinges 26 may allow upper housing 12A to rotate about axis 22 in directions 24 relative to lower housing 12B. The plane of lid (upper housing) 12A and the plane of lower housing 12B may be separated by an angle that varies between 0° when the lid is closed to 90°-140°, or more when the lid is fully opened.

As shown in FIG. 1, device 10 may have input-output devices such as track pad 18 and keyboard 16. Track pad 18 may be formed from a touch sensor that gathers touch input from a user's fingers. Keyboard 16 may have an array of keys 16K that protrude through openings in the upper wall of housing 12B.

Display 14 may serve as a primary display for device 10 and may sometimes be referred to as a main display. Device 10 may also have one or more additional displays such as ancillary display 20. Ancillary display 20 may be touch sensitive and may serve to display interactive reconfigurable visual elements (icons such as function-key buttons, image thumbnails, etc.). Because ancillary display 20 can be used to display content such as dynamically adjustable function keys, ancillary display 20 may sometimes be referred to as a dynamic function row or dynamic function row display. In general, any suitable content may be displayed on display 20.

In the example of FIG. 1, ancillary display 20 has an elongated shape (e.g., a long thin rectangular shape) that allows ancillary display 20 to be mounted to base housing 12B adjacent to the uppermost row of keyboard keys 16K in keyboard 16. In this location, ancillary display 20 lies between the upper edge of keyboard 16 and the lower edge of main display 14 and is therefore adjacent to both keyboard 16 and main display 14. There is a single ancillary display 20 in the illustrative configuration for device 10 that is shown in FIG. 1. Additional ancillary displays may be included in device 10, if desired.

Display 14 and/or display 20 may be a liquid crystal display (LCD), a plasma display, an organic light-emitting diode (OLED) display, an electrophoretic display, or a display implemented using other display technologies. A touch sensor may be incorporated into displays 14 and/or 20 (i.e., display 14 may be a touch screen display and/or display 20 may be a touch screen display). With one illustrative configuration, which may sometimes be described herein as an example, main display 14 may be liquid crystal display or organic light-emitting diode display that is insensitive to touch and ancillary display 20 may be an elongated touch sensitive display such as a touch sensitive organic light-emitting diode display (e.g., a dynamic function row display that includes a two dimensional touch sensor that overlaps an array of pixels in display 20). Other configurations may be used, if desired.

Touch sensors for a touch sensitive display such as ancillary display 20 may be resistive touch sensors, capacitive touch sensors, acoustic touch sensors, light-based touch sensors, force sensors, or touch sensors implemented using other touch technologies. With one illustrative configuration, ancillary display 20 may include an array of capacitive touch sensor electrodes that form a capacitive touch sensor for display 20.

If desired, device 10 may also have components such as a camera, microphones, speakers, buttons, status indicator lights, sensors, and other input-output devices. These devices may be used to gather input for device 10 and may be used to supply a user of device 10 with output. Ports in device 10 may receive mating connectors (e.g., an audio plug, a connector associated with a data cable such as a Universal Serial Bus cable, a data cable that handles video and audio data such as a cable that connects device 10 to a computer display, television, or other monitor, etc.).

As shown in FIG. 1, device 10 may include light sensing components such as one or more ambient light sensors 30. An ambient light sensor 30 may, for example, be mounted behind a portion of display 14 or may be mounted in base housing 12B or other parts of device 10. Ambient light sensor(s) 30 may be used in gathering information on ambient lighting conditions. For example, a monochrome ambient light sensor (or sensors) may be used in gathering ambient light intensity information. If desired, device 10 may have color ambient light sensors (e.g., light sensors that measure ambient light color and ambient light intensity). Color measurements may produce color data such as color coordinates (e.g., CIE x and y) and color temperature information (e.g., correlated color temperatures). During operation, device 10 can make adjustments to the color of content on display 14 and/or display 20 and may make adjustments to keyboard backlighting for keys 16K based on light intensity and/or color information from sensors 30. Color adjustments may also be made based information such as the brightness settings for keyboard keys 16K. In some configurations, display adjustments can be made based on user input (e.g., keypress input, user input to a selectable icon on display 20, user selection of menu options presented on display 14, or other user input). User input may, as an example, be used to raise or lower screen brightness, to adjust automatic keyboard backlight brightness adjustment functions, to manually sets a keycard brightness level, etc.).

The color of keys 16K is affected by the color of backlight illumination passing through keys 16K and the color of ambient light reflecting off of keys 16K. Keys 16K may have symbols such as white alphanumeric characters and other symbols—sometimes referred to as glyphs. The color of backlight illumination passing through these symbols and the color of the ambient light reflecting off of the front of these symbols gives keys 16K (e.g., the white portion of keys 16K) an apparent color when viewed by a user of device 10. In some scenarios, there is a potential for mismatch between the apparent color of keys 16K and the color of images on displays such as display 20 and/or 14. Display content can be characterized by a white point (color cast). When the white point of a display is set to a fixed value (e.g., the CIE Standard Illuminant D65), there is a potential for mismatch between the white point of the display and the apparent color of keys 16K. For example, in bright cold lighting, keys 16K may have a much colder color than content on the display. Particularly when displaying content on ancillary display 20, which is adjacent to keys 16K, it may be desirable to minimize the difference between the white point of display 20 and the apparent color of keys 16K to avoid an undesirable visual conflict between these two light sources.

To avoid this potential conflict, device 10 may adjust the white point of display 20 and/or display 14 to help reduce significant differences between the color cast of displayed images and the apparent color of keys 16K.

Figure 2:
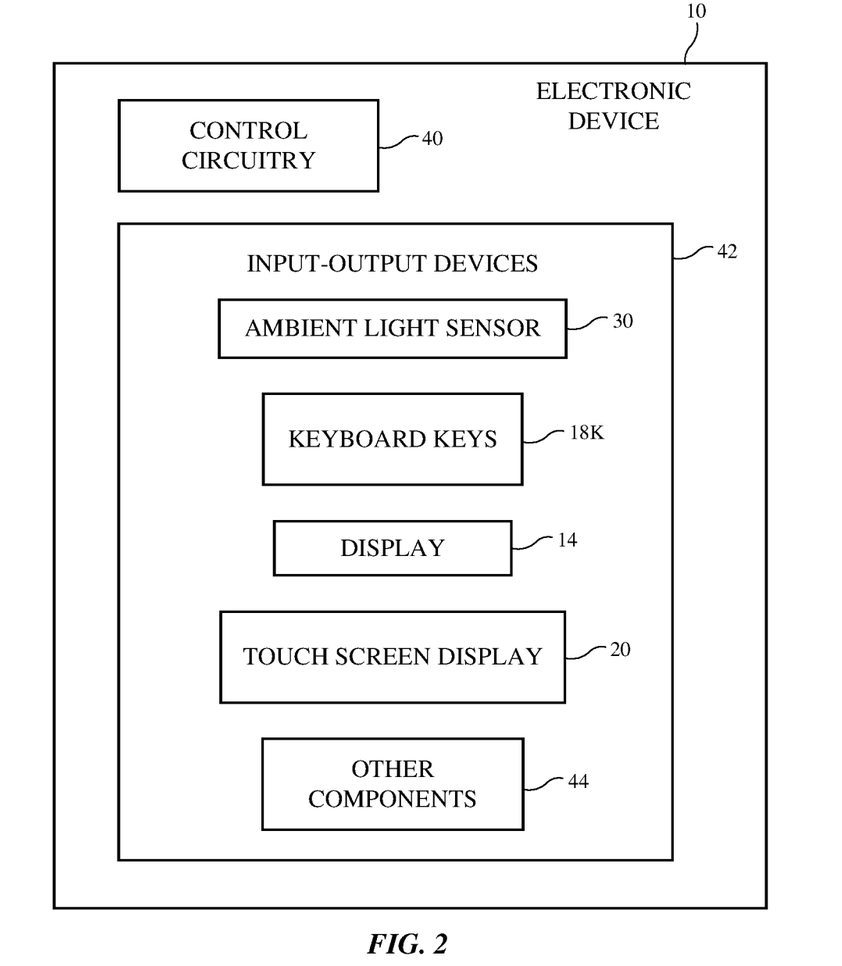
FIG. 2 is a schematic diagram of an illustrative electronic device in accordance with an embodiment.

A schematic diagram showing illustrative components that may be used in device 10 is shown in FIG. 2. As shown in FIG. 2, device 10 may include control circuitry 40. Control circuitry 40 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in circuitry 40 may be used to control the operation of device 10. This processing circuitry may be based on one or more microprocessors, microcontrollers, digital signal processors, application specific integrated circuits, etc.

Circuitry 40 may be used to run software on device 10, such as internet browsing applications, voice-over-internet-protocol (VOIP) telephone call applications, email applications, media playback applications, an operating system or other software that controls display operations associated with adjusting the color cast (white point) for displayed content, software associated with adjusting display brightness, software for controlling adjustments to keyboard backlighting brightness, etc. To support interactions with external equipment, circuitry 40 may be used in implementing communications protocols. The software (code) for implementing these functions may be stored in a non-transitory storage medium (e.g., non-volatile memory, etc.). When configured appropriately by software code, circuitry 40 can ensure that displayed content such as content displayed on ancillary display 20 will have a color cast that is aesthetically appealing (e.g., a color cast that is matched to or that is at least adjusted towards the color of glyphs on keyboard keys 16K, etc.).

Electronic device 10 may include input-output devices 42. Input-output devices 42 may be used by a user to supply data to device 10 and/or may be used to gather data from the environment surrounding device 10. Input-output devices 42 may also be used to provide data from device 10 to external devices and/or to supply output to a user. Input-output devices 42 may include ambient light sensor(s) 30, keyboard keys 18K, displays such as main display 14 and ancillary touch screen display 20, and may include other components 44. Components 44 may include user interface devices, data port devices, and other input-output components. For example, components 44 may include touch screens, displays without touch sensor capabilities, buttons, scrolling wheels, touch pads, key pads, keyboards, microphones, cameras, buttons, speakers, status indicators, light sources, audio jacks and other audio port components, digital data port devices, light sensors, light-emitting diodes, motion sensors (accelerometers), capacitance sensors, proximity sensors, magnetic sensors, force sensors (e.g., force sensors coupled to a display to detect pressure applied to the display), wireless circuitry, etc.

Figure 3:
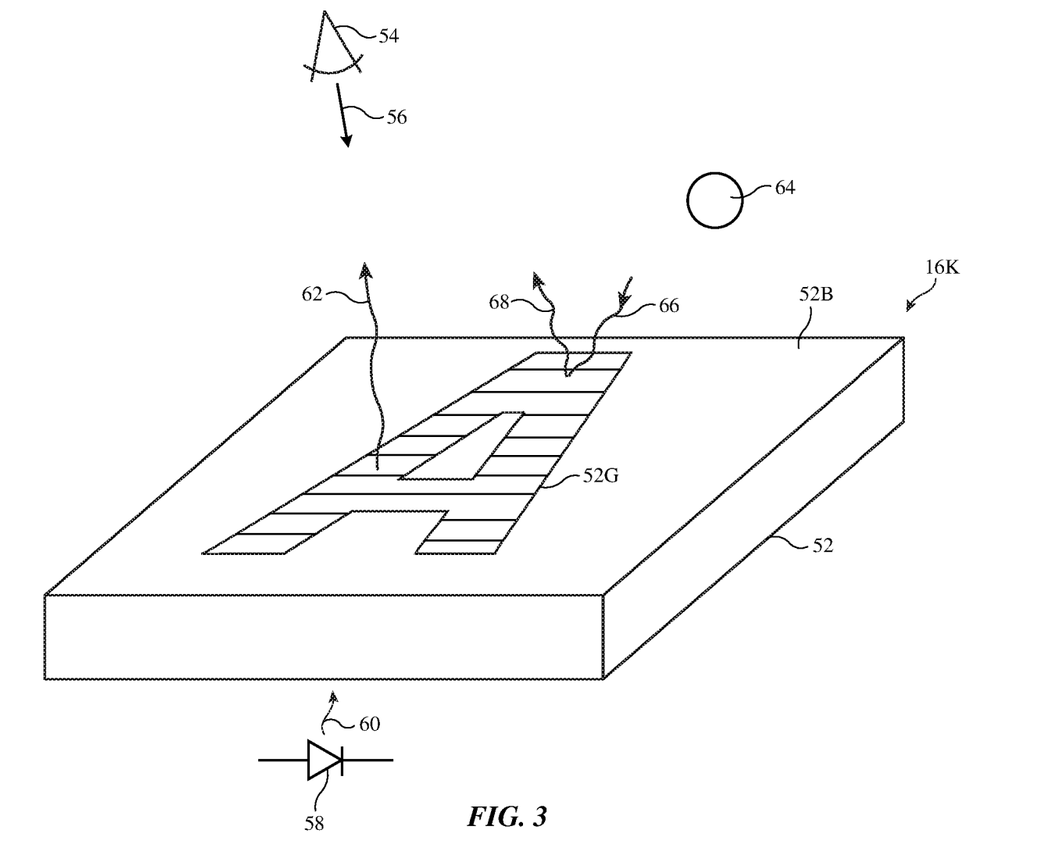
FIG. 3 is a perspective view of an illustrative keyboard key with a glyph in accordance with an embodiment.

A perspective view of an illustrative keyboard key in keyboard 16 is shown in FIG. 3. As shown in FIG. 3, keyboard key 16K may have a key member (sometimes referred to as a key cap) such as key member 52. Surface 52B of key member 52 may have a dark color (e.g., black) or other suitable color. A glyph such as glyph 52G may be present on the face of key member 52. Glyph 52G (e.g., an alphanumeric character or other keyboard key symbol) may serve as a label for key 16K and may be formed from white ink or other material that is visible against the background presented by the dark color on surface 52. If desired, keyboard keys such as key 16K may have other configurations (e.g., configurations in which glyphs are formed by printing black labels surrounded by white backgrounds). The configuration of FIG. 3 in which surface 52B is dark (e.g., black) and in which glyph 52G has a lighter color such as white may sometimes be described herein as an example.

Keyboard key 16K may be backlit. For example, a light source such as light-emitting diode 58 (e.g., a white light-emitting diode or other backlight illumination source) may emit light 60 that is blocked by surface 52B and allowed to pass through glyph 52G, which is translucent. Light transmitted through glyph 52G (e.g., transmitted light 62) may be viewed by a user such as user 54 who is viewing keyboard key 16K in direction 56. At the same time, ambient light may reflect off of key 16K. As a result, viewer 54 will generally observe a mixture of keyboard backlight illumination and reflected ambient light when viewing key 16K.

The apparent color of key 16K (glyph 52G) to viewer 54 is therefore influenced by the color of transmitted light 62 and reflected ambient light (e.g., ambient light 66 from ambient light source 64 that has reflected off of glyph 52G as reflected ambient light 68). In scenarios in which glyphs 52G are formed from white ink, relatively small color changes are imparted to transmitted light 62 and reflected light 68 by the ink making up glyphs 52G. Accordingly, the impact of the color of the ink in glyphs 52G can be neglected.

The color of transmitted light 62 (sometimes referred to as keyboard light, keyboard key light, keyboard backlight illumination, keyboard key illumination, etc.) is determined by the color of diode 58. With one illustrative arrangement, diode 58 may produce white light with a correlated color temperature (CCT) of 6000K (or 6500K, etc.). This color closely matches the white point used for displays 20 and 14 (e.g., when displays 20 and 14 have D65 white points). The color of reflected ambient light 68 depends on the operating environment of device 10 (e.g., outdoors in cold light, indoors in warm light, etc.).

The apparent color of key 16K depends on the color of light 62 and the color of light 68 and relative intensities of these two types of light. In very bright ambient lighting conditions, light 62 is overwhelmed by reflected light 68, so the apparent color of key 16K will match the color of light 68. In dim ambient lighting conditions, where the intensity of backlight 62 is much greater than that of ambient light 68, the color of light 62 will dominate.

During operation, device 10 (e.g., control circuitry 40) may adjust the magnitude of the backlight illumination 60 produced by light-emitting diode 58. For example, automatic adjustments to light-emitting diode 58 may be made in response to ambient light sensor measurements of ambient light intensity levels (e.g., if a user has previously directed device 10 to automatically illuminate keyboard 16 in low light). Control circuitry 40 may also set the backlight intensity for keyboard 16 based on a user selected brightness level. As a user uses device 10, the user may place device 10 in a dim or brightly lit environment. To determine the color of keys 16K, device 10 can make ambient light measurements with ambient light sensor 30 (e.g., measurements of ambient light color and ambient light intensity). Device 10 can also use control circuitry 40 to determine the current operating setting for diode 58 and can therefore determine the current state of the keyboard backlight illumination. The current brightness setting for diode 58 can be used in determining the intensity of light 62 and the known color temperature of diode 58 can be used in determining the color of light 62. With this information, control circuitry 40 can determine the color of each keyboard key 16K and can take appropriate action. For example, control circuitry 40 can adjust the white point of display 20 to reduce mismatch between the white point of display 20 and the apparent color of keys 16K.

Figure 4:
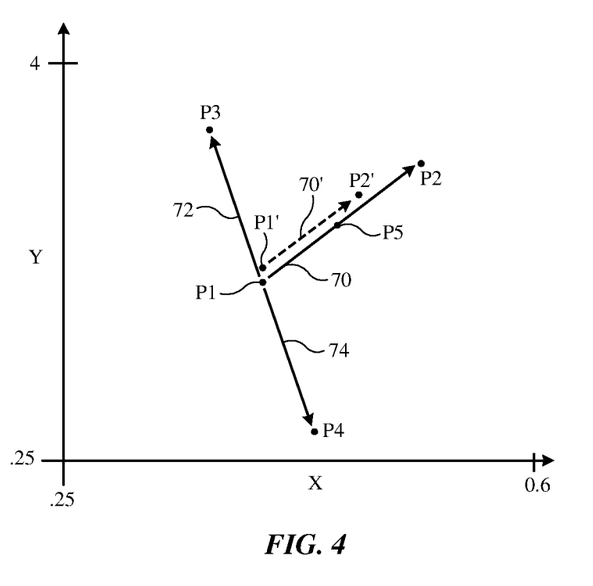
FIG. 4 is a color space diagram showing how the apparent color of keyboard key glyphs can change as a function of ambient lighting and keyboard backlighting conditions and showing how display color adjustments may be made in accordance with an embodiment.

FIG. 4 is a color space diagram (e.g., a portion of the CIE 1931 color space in which color is represented in terms of color coordinates x and y) illustrating how device 10 can make color adjustments to display 20 in different operating scenarios. In the example of FIG. 4, keyboard backlight illumination 62 (diode 58) has a color represented by point P1 (e.g., a 6000K correlated color temperature) and display 20 has a white point represented by point P1' (e.g., D65). These colors are close to each other, so in low ambient lighting conditions when display 20 has a D65 white point and keys 16K have a 6000K color temperature, there will not be an excessive mismatch in the colors of display 20 and keys 16K.

At larger ambient light levels, the appearance of keys 16K can change significantly. In the example of FIG. 4, three different ambient lighting scenarios are present. In the first scenario, ambient light has a color represented by point P2. In the second and third scenarios, ambient light has colors represented by points P3 and P4, respectively. Point P2 represents warm ambient light. Point P4 represents cold ambient light. Point P3 (in this example) represents light with a greenish color.

The apparent color of key 16K depends on the relative intensity of ambient light 68 to key backlight 62 and lies along curves such as curves 70, 72, and 74, depending on whether the ambient light color is represented by point P2, point P3, or point P4, respectively. The relative intensity of ambient light 68 to backlight 62 can be represented by a ratio R, where R is equal to ambient light intensity divided by backlight intensity. The value of R determines the location on each curve (curve 70, 72, or 74 in this example) where the color of key 16K lies.

Consider, as an example, the situation in which ambient light 68 has the warmish color represented by point P2. In this situation, the apparent color of key 16K will be represented by a point that lies somewhere along curve 70. When ambient light is not present (R=0), the color of key 16K will be determined by the color of backlight 62. As a result, the color of key 16K will be represented by point P1 when R is 0. When ambient light 68 is very strong and/or diode 58 is off (R is infinite), the apparent color of key 16K will be represented by point P2. At intermediate values of R, the apparent color of key 16K will lie midway between point P1 and P2 on curve 70. For example, in a typical office lighting environment, where the value of R is 3 (as an example), the apparent color of key 16K may be represented by point P5 on curve 70.

To ensure that display 20 has a color that does not vary too much from that of keys 16K, control circuitry 40 may adjust the white point of display 20 along a curve such as display color adjustment curve 70' in accordance with the measured value of R. Curve 70' is similar to curve 70, but uses the default white point of display 14 and/or 20 (e.g., D65 in the example of FIG. 4) as its origin P1'. The color of point P1' (the display white point prior to adjustment) is sufficiently close to that of point P1 (the color of the backlight illumination for keys 16K) that these points can be taken to be equivalent (e.g., P1' can be taken to be the origin of color adjustment curve 70' and any differences between the colors at points P1' and P1 can be neglected). The length of curve 70' (e.g., the distance between point P1' and point P2') differs from the length of curve 70, because curve 70' has been scaled using a scaling factor SF (sometimes referred to as a white point adaption scaling factor, etc.). The use of scaling factor SF helps avoid over-adjustment of the white point (which a user of device 10 might find to be visually unappealing). When scaling factor SF is used, the length of the color adjustment curve will be reduced (e.g., curve 70' will be shorter than curve 70) so that color adjustments will be more modest than if the white point of display 20 were exactly matched to apparent color of keys 16K. The amount by which the white point of the display is adjusted with curve 70' is therefore reduced in magnitude (in accordance with the scaling factor) relative to the amount by which the color of keys 16K varies over curve 70.

Scaling factor SF may have a value between 0 and 1. When the scaling factor is 0, no color adjustments to display 20 take place. When the scaling factor is 1, the white point of display 20 is adjusted between P1' when R is 0 and P2 when R is infinite. When the scaling factor has an intermediate value (e.g., a value of 0.2-0.5, 0.1-0.6, at least 0.15, less than 0.5, less than 0.4, less than 0.3, or other suitable value between 0 and 1), the amount of color adjustment that is made to the color of display 20 will follow modified (scaled) color adjustment curve 70' of FIG. 4.

When a scaled color adjustment curve such as curve 70' is used, the white point of display 20 will be set to P1' when R is zero and will be set to P2' when R is infinite. At intermediate values of R, control circuitry 40 will adjust display 20 to have a white point that lies in a corresponding intermediate location along scaled color adjustment curve 70' such as point P5'. Color P2' is a color that is intermediate between P1' and P2, but that does not equal P2 because of the user of a scaling factor SF that is less than 1 (e.g., 0.2-0.5, etc.). The white point adjustments that are made to display 20 with this approach (curve 70') are less severe than non-scaled white point adjustments (curve 70) and may therefore be more visual pleasing to the user.

Figure 5:
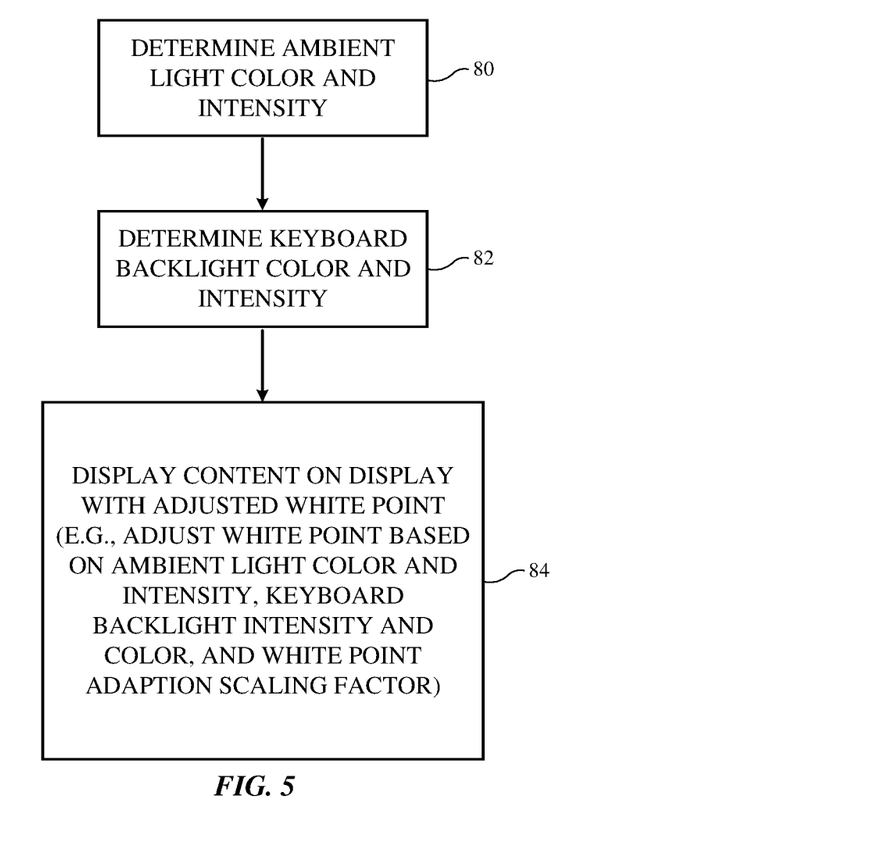
FIG. 5 is a flow chart of illustrative operations involved in using an electronic device such as the device of FIG. 1 in accordance with an embodiment.

A flow chart of illustrative operations involved in using device 10 to make color adjustments to harmonize the appearance of keyboard keys 16K and display 20 is shown in FIG. 5.

During the operations of block 80, control circuitry 40 may use color ambient light sensor 30 to gather information on the color and intensity of ambient light in the vicinity of device 10 (e.g., ambient light 66 and 68 of FIG. 3).

During the operations of block 82, control circuitry 40 may determine the color and intensity of the backlight illumination for keys 16K (e.g., backlight 60 and 62 of FIG. 3). The color of the backlight illumination for keys 16K is known from the known color of diode 58, which may be retained in storage in control circuitry 40. Diode 58 may, as an example, have a coordinated color temperature of 6000K, may be a D65 diode, or may be a diode that emits other light (e.g., other white light). The intensity of backlight illumination from diode 58 as a function of keyboard brightness setting can be measured (e.g., calibrated) during manufacturing and this information stored in storage in control circuitry 40 for use during the operations of block 82.

During the operation of block 84, control circuitry 40 may determine the relative contributions of ambient light and keyboard backlight to the appearance of glyphs 52G. With one illustrative arrangement, control circuitry 40 may generate a white point adjustment curve such as curve 72' based on the white point of display 20 (point P1' of FIG. 4) and the ambient light color (point P2) and based on the scaling factor SF (e.g., a value of 0.2-0.5 or other suitable scaling factor that adjusts the length of curve 70'). The location of the adjusted white point of display 20 is located at a point along white point adjustment curve 70' that is determined by the relative contributions of ambient light and key backlight. The adjusted white point value may be identified by computing the ratio R by dividing ambient light intensity by keyboard backlight intensity and using this value of R to determine the location of the adjusted white point on curve 70' or by otherwise taking into consideration the relative contributions of the ambient light and keyboard backlight to determine the apparent color of keys 16K. After determining an appropriate adjusted white point to use for display 20, display 20 can be adjusted to exhibit the new white point (e.g., content may be displayed on display 20 in accordance with the selected white point). If desired, display 14 may be adjusted to exhibit the same white point (or a white point adjustment may be made for display 14 using a larger or smaller scaling factor or using other adjustment techniques). In some configurations, the white point for display 20 may be adjusted without adjusting the white point of display 14 or the white point for display 14 may be adjusted without adjusting the white point of display 20.

The foregoing is merely illustrative and various modifications can be made to the described embodiments. The foregoing embodiments may be implemented individually or in any combination.

What is claimed is:

1. An electronic device, comprising:
a first display with a first white point;
a second display with a second white point;
a keyboard having a light source configured to emit backlight illumination and keyboard keys that are illuminated by the backlight illumination, wherein the backlight illumination has a backlight illumination intensity:
a color ambient light sensor; and
control circuitry configured to adjust the second white point at least partly in response to information from the color ambient light sensor and at least partly based on the backlight illumination intensity.

2. The electronic device defined in claim 1 wherein the electronic device comprises a base housing and a display housing that are coupled by a hinge and wherein the first display is mounted in the display housing.

3. The electronic device defined in claim 2 wherein the keyboard is in the base housing and the second display is in the base housing.

4. The electronic device defined in claim 3 wherein the second display is adjacent to the keyboard and the first display and wherein the second display includes a touch sensor.

5. The electronic device defined in claim 4 wherein keyboard keys each have a glyph through which the backlight illumination passes.

6. The electronic device defined in claim 5 wherein the control circuitry is configured to adjust the first white point based at least partly on the information from the color ambient light sensor.

7. The electronic device defined in claim 5 wherein the information from the color ambient light sensor comprises ambient light color and ambient light intensity and wherein the control circuitry is configured to adjust the second white point based at least partly on the ambient light color and the ambient light intensity.

8. The electronic device defined in claim 7 wherein the backlight illumination has a backlight illumination color and wherein the control circuitry is configured to adjust the second white point based at least partly on the ambient light color, the ambient light intensity, and the backlight illumination intensity.

9. A laptop computer, comprising:
a display housing;
a first display mounted in the display housing;
a base housing that is rotatably coupled to the display housing;
a keyboard in the base housing having a plurality of keyboard keys;
a second display adjacent to the keyboard;
a color ambient light sensor configured to measure ambient light color and ambient light intensity; and
control circuitry configured to display content on the second display with a white point that is selected based on the ambient light color, the ambient light intensity, and a white point adaptation scaling factor.

10. The laptop computer defined in claim 9 wherein the white point adaption scaling factor has a value of 0.1 to 0.6, wherein the second display is characterized by a D65 white point, and wherein the selected white point has a color that is between the D65 white point and the ambient light color.

11. The laptop computer defined in claim 9 further comprising light-emitting diodes that supply backlight illumination for the keyboard keys, wherein the backlight illumination has a backlight illumination color and a backlight illumination intensity and wherein the control circuitry is configured to select the white point for the second display based at least partly on the backlight illumination intensity.

12. The laptop computer defined in claim 11 wherein the keyboard keys are illuminated with backlight illumination having a backlight illumination intensity and wherein the control circuitry is configured to select the white point for the second display based at least partly on the backlight illumination intensity.

13. The laptop computer defined in claim 9 wherein the control circuitry is configured to adjust a color cast associated with displaying content on the first display based on the ambient light color.

14. An electronic device, comprising:
a main display on which first content is displayed with a first white point;
a keyboard having keys with glyphs that are illuminated using backlight illumination from light-emitting diodes, wherein the backlight illumination has a backlight illumination intensity;
a dynamic function row display on which second content is displayed with a second white point;
a color ambient light sensor that measures ambient light color and ambient light intensity; and
control circuitry configured to:
adjust the first white point based on the ambient light color; and
adjust the second white point based on the ambient light intensity and the backlight illumination intensity.

15. The electronic device defined in claim 14 wherein the control circuitry is further configured to adjust the second white point based on the ambient light color.

16. The electronic device defined in claim 15 wherein the control circuitry is configured to adjust the second white point based on a white point adaptation scaling factor.

17. The electronic device defined in claim 14 wherein the electronic device comprises a base housing and a display housing that are coupled by a hinge and wherein the main display is mounted in the display housing.

18. The electronic device defined in claim 17 wherein the control circuitry is further configured to adjust the first white point based on the ambient light color.

* * * * *